United States Patent [19]

Howerton et al.

[11] 4,177,688
[45] Dec. 11, 1979

[54] ENDLESS POWER TRANSMISSION BELT AND METHOD FOR MAKING SAME

[75] Inventors: Anderson W. Howerton, Nixa; Darrell L. Klein; James R. Thomas, both of Springfield, all of Mo.

[73] Assignee: Dayco Corporation, Dayton, Ohio

[21] Appl. No.: 875,980

[22] Filed: Feb. 8, 1978

[51] Int. Cl.² .......................... F16G 5/06; F16G 5/22
[52] U.S. Cl. ..................... 74/233; 156/137; 156/142
[58] Field of Search ............ 74/232, 233, 234, 231 R, 74/231 CB, 231 P, 229; 156/137, 138, 139, 140, 141, 142

[56] References Cited

U.S. PATENT DOCUMENTS

| | | | |
|---|---|---|---|
| 1,729,329 | 9/1929 | Chilton | 74/232 |
| 2,067,400 | 1/1937 | Koplin et al. | 74/233 |
| 2,607,713 | 8/1952 | Waugh | 156/140 |
| 2,802,511 | 8/1957 | Waugh | 156/140 |
| 2,847,865 | 9/1958 | Rockoff et al. | 74/233 |
| 3,090,716 | 5/1963 | Stevens | 74/233 |
| 3,404,577 | 10/1968 | Zahn | 74/233 |
| 3,523,461 | 8/1970 | Nemecek et al. | 74/229 |
| 3,564,933 | 2/1971 | Clinkenbeard | 74/233 |
| 3,838,605 | 10/1974 | Müller | 74/234 |
| 3,853,017 | 12/1974 | White, Jr. et al. | 74/234 |
| 3,948,113 | 4/1976 | Stork | 74/234 |
| 3,995,507 | 12/1976 | White et al. | 156/140 |
| 3,996,813 | 12/1976 | Henderson et al. | 74/233 |
| 4,011,766 | 3/1977 | Waugh | 74/234 |

FOREIGN PATENT DOCUMENTS

| | | | |
|---|---|---|---|
| 863616 | 2/1971 | Canada | 74/234 |
| 1396478 | 6/1975 | United Kingdom | 74/234 |

*Primary Examiner*—Samuel Scott
*Assistant Examiner*—William R. Henderson
*Attorney, Agent, or Firm*—Reuben Wolk

[57] ABSTRACT

An endless power transmission belt made primarily of elastomeric material is provided which comprises a plurality of laterally spaced belt elements and a tie band interconnecting the radially outer surfaces of the belt elements wherein the tie band comprises a plurality of cooperating layers, one of these layers being bonded to the radially outer surfaces of the belt elements and comprising a fiber-loaded elastomeric matrix, and another of the cooperating layers comprising a fabric layer. The groove between adjacent belt elements extends into the fiber-loaded matrix layer of the tie band. Also provided is a method for making this belt.

11 Claims, 7 Drawing Figures

ENDLESS POWER TRANSMISSION BELT AND METHOD FOR MAKING SAME

BACKGROUND OF THE INVENTION

This invention relates to power transmission belts. In particular this invention relates to multi-ribbed power transmission belts.

Multiple ribbed belts are particularly suitable for heavy power transmission systems. Experience has shown that in a drive system using a plurality of single belts independent of one another, the cooperation of the single belts is affected by unavoidable manufacturing tolerances and wearing of the pulley grooves. As a result, the belts can lie differently in the grooves and consequently the belts tend to lead or lag behind one another. Other problems with single belts include flapping, twisting and vibration which lead to their premature destruction. A tie band interconnecting the individual belts functions to oppose the relative movements of the belts thereby coordinating their over-all behavior. Typical of this type belt are those disclosed in U.S. Pat. No. 3,404,577 to Zahn, U.S. Pat. No. 3,523,461 to Nemecek et al, U.S. Pat. No. 3,564,933 to Clinkenbeard, U.S. Pat. 3,838,605 to Muller and U.S. Pat. 3,948,113 to Stork.

It is an object of this invention to provide a novel multiple ribbed belt.

It is another object of this invention to provide a method for making the multiple ribbed belt of this invention.

Other objects, aspects and advantages of the present invention will be apparent to those skilled in the art.

SUMMARY OF THE INVENTION

In accordance with the present invention there is provided an endless power transmission belt comprising a plurality of laterally spaced belt elements and a tie band interconnecting the radially outer surfaces of the belt elements wherein the tie band comprises a plurality of cooperating layers, one of these layers being bonded to the radially outer surfaces of the belt elements and comprising a fiber-loaded elastomeric matrix wherein the fibers are oriented at an angle of about 90° to the endless path of the belt, and another of the cooperating layers comprising a fabric layer.

Also in accordance with the invention, there is provided a method for making the belt of this invention, which comprises building a belt sleeve by sequentially wrapping around a building mandrel the following layers: a first fabric layer, an optional layer of elastomeric material, an optional second layer, a layer of fiber-loaded elastomeric material wherein the fibers are oriented about perpendicular to the endless path of the finished belt, a layer of elastomeric material which forms the tension section in the finished belt, a load-carrying layer, and a layer of elastomeric material which forms the compression section in the finished belt. The belt sleeve is next cured or vulcanized. V-shaped sections are then cut and removed from the belt sleeve at spaced intervals. The belt sleeve is finally ground to provide the desired cross-section of the belt elements.

BRIEF DESCRIPTION OF THE DRAWING

In the drawing,

FIG. 2 illustrates a modification of the belt of FIG. 1;

DETAILED DESCRIPTION OF THE INVENTION

Figure 1:
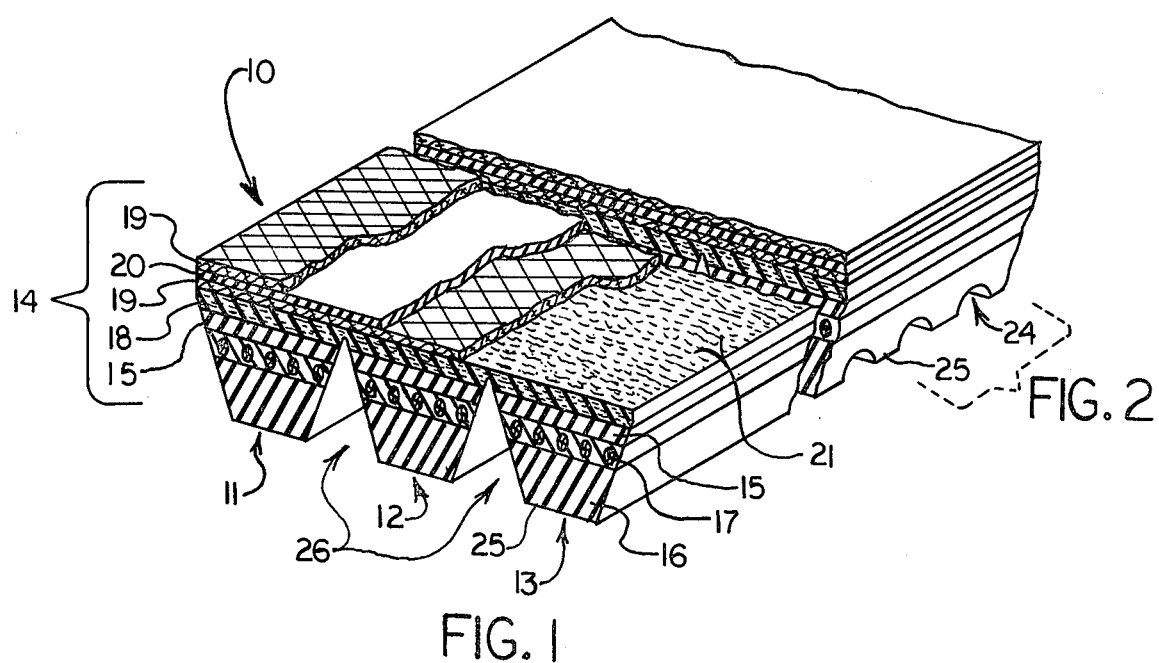
FIG. 1 is a perspective view with parts in cross-section and parts broken away illustrating an exemplary embodiment of the belt of this invention.

As shown in FIG. 1 the belt 10 comprises a plurality of laterally spaced belt elements 11, 12, and 13 and a tie band 14 interconnecting the radially outer surfaces of the belt elements. Each of the belt elements has a generally trapezoidal cross section and comprises an outer tension section 15, an inner compression section 16 and a load-carrying section 17 therebetween.

The band 14 comprises a plurality of cooperating layers and in this example includes a fiber loaded elastomeric matrix layer 18 disposed adjoining the tension section 15 of the individual belt elements, fabric layers 19 and an elastomeric layer 20 between the fabric layers.

The matrix layer 18 comprises an elastomer having a plurality of fine fibers dispersed substantially uniformly throughout the body thereof. A representative few of these fibers have been designated by the same reference numeral 21. The fibers 21 are arranged to lie substantially parallel to each other and substantially perpendicular to the endless path of the belt 10 when the belt is viewed in cross-section. The fibers 21 are randomly arranged in the elastomeric matrix material in a substantially infinite number of planes whereby the layer 18 is free of shear planes.

The fabric layers 19 can be any suitable fabric known in the art. The fabric can be woven as shown in the exemplary belt 10. The fabric can be a square woven fabric wherein the warp and weft threads are disposed at an angle of about 90° with each other yet with such warps and wefts disposed at an angle of 45° with the longitudinal axis of the belt 10. Alternatively, the fabric can be laid with the warps disposed perpendicular to the longitudinal axis and the wefts disposed parallel thereto.

In a modified form the belt 10 utilizes one or more fabric layers 19 in the form of a so-called stress-relieved fabric wherein the warps and wefts are disposed at an obtuse angle to each other which ranges between 95° and 155°. Such stress-relieved fabric is generally laid so that imaginary lines bisecting the angle between the warps and wefts lie parallel to the longitudinal axis of the belt 10.

Figure 3:
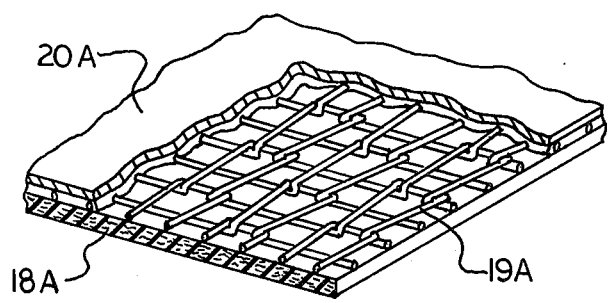
FIG. 3 is a fragmentary view illustrating another modification of the belt of FIG. 1 wherein the fabric layer in the tie band employs a knitted fabric.

In the modification of the belt 10 shown in FIG. 3 the fabric layer or layers 19A instead of being woven layers may be in the form of knitted layers having threads arranged in the knitted pattern as illustrated. It will be appreciated that the knitted layer or layers 19A may be layers of ordinary knitted fabric or may be a so-called non-run type knitted fabric.

Figure 4:
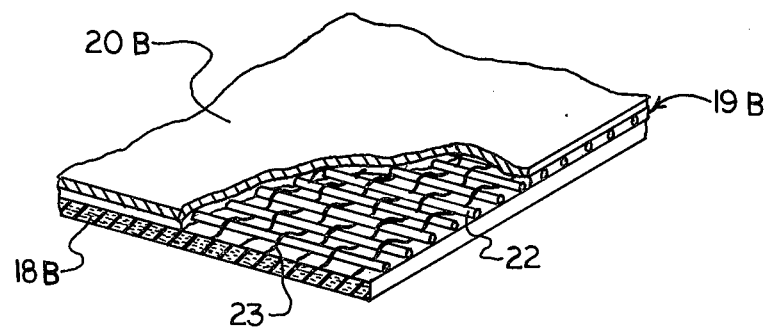
FIG. 4 is a framentary view illustrating yet another modification of the belt of FIG. 1 wherein the fabric layer in the tie band employs a cord cord fabric.

In the modification of the belt 10 shown in FIG. 4, the fabric layer or layers 19B instead of being woven layers may be in the form of a layer comprising a plurality of tensile members, designated generally by the reference number 22, and such members are arranged in spaced substantially parallel relation along and transverse the endless path of the belt 10. The tensile members 22 are held in substantially parallel relation by a plurality of comparatively weak tie strands 23 which are arranged in spaced substantially parallel relation along the endless path of the belt 10. The members 22 may comprise the strength cords of a so-called cord fabric which is often referred to in the art as "tire cord" and such tire cord has the comparatively weak tie strands 23 holding the strength cords substantially parallel.

As shown in FIG. 2, the compression section 16 of the belt elements 11, 12 and 13 may include a plurality of grooves 24 therein extending transversely of the belt 10. The grooves 24 penetrate from the bottom surface 25 of the belt into the compression section 16 and terminate short of and are spaced from the load-carrying section 17.

As shown in FIG. 1, the grooves 26 between adjacent belt elements 11, 12 and 13 extend from the bottom surface 25 of the belt 10 through the compression section 16, the load-carrying section 17 and the tension section 15 into the fiber-loaded elastomeric matrix layer 18 of the tie band 14 and terminating short of and spaced from the lower fabric layer 19.

The method of making the power transmission belt of this invention comprises the steps of forming a belt sleeve of substantially uniform cross-section, curing the sleeve, and forming at least one groove in the outer surface of the sleeve, thereby forming a plurality of belt elements joined by a tie band.

Figures 5, 6, 7:
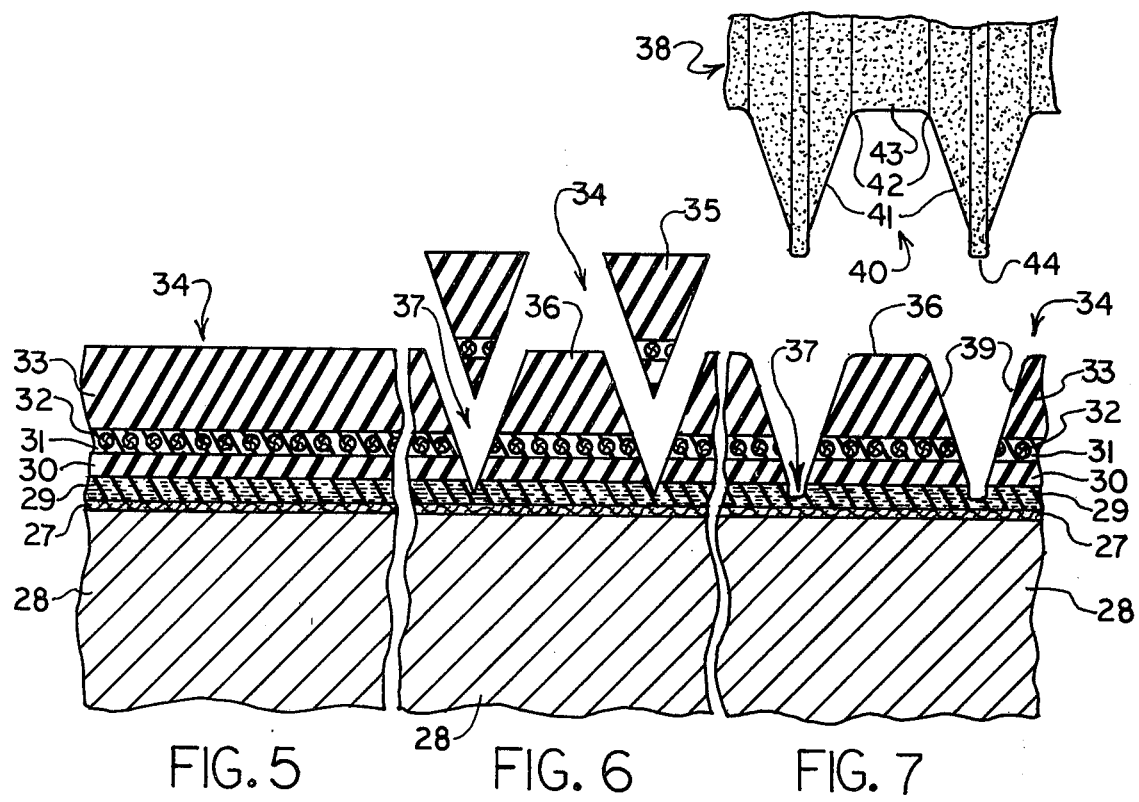
FIGS. 5-7 illustrate a portion of the steps of building the belt of FIG. 1.

The belt sleeve is built in inverted fashion as shown in FIG. 5. A layer of fabric 27 is first applied on a mandrel 28, then a layer of fiber-loaded elastomeric material 29 is applied over the fabric 27. Next, a layer 30 of elastomeric material which comprises the tension section of the finished belt is applied on top of the fiber-loaded layer 29.

Once the tension layer 30 has been wrapped or placed in position an elastomeric cushion material 31 is wrapped against the tension material 30. A load-carrying cord is then helically wound around the cushion material 31. Another layer cushion material 31 is wrapped around the load-carrying cord, followed by a layer of elastomeric material 33 which comprises the compression section in the finished belt.

The belt sleeve designated generally by the reference numeral 34 is cured or vulcanized in accordance with techniques known in the art.

The cured belt sleeve, also still designated by the reference numeral 34 for convenience and as shown in FIG. 6 is mounted for rotation on a suitable cutting device, not shown, having a rotatble mandrel, also designated by the numeral 28, which is used to provide a plurality of V-shaped cut sections 35 along the length of the sleeve 34. The cut sections 35 are removed to form a plurality of ribs 36 having generally trapezoidal cross-sections with grooves 37 therebetween.

The sleeve 34, having V-shaped cuts roughly defining the ribs 36 and grooves 37 is next mounted for rotation on a suitable grinding device, such as that illustrated and described in U.S. Pat. No. 3,891,405 and having a contoured grinding wheel 38 which is used to precisely define the non-parallel sides 39 of the ribs 36 and the groove 37 between adjacent ribs 36. The grinding wheel 38 has a plurality of sets 40 of integral grinding means, each set comprising a pair of substantially identical outwardly diverging integral grinding surfaces 41 which terminate at inner edges 42 adjoined by a right circular cylinder grinding surface 43. Integral disc-like portions 44 adjoin and connect associated surfaces 41 of adjoining sets 40. During operation, the portions 44 cut into the fiber-loaded matrix layer 29 of the tie band 14 a sufficient distance such that the ribs 36 and the grooves 37 are completely defined, yet not enough to damage the fabric layer 27.

The grinding wheel 38 is retracted and banded belts having the desired number of ribs are cut from the sleeve 34.

The belts of this invention are illustrated in the drawings as being made of rubber; however, it will be appreciated that such belts may be made of any suitable elastomeric material, either natural or synthetic, including synthetic plastic materials used in the art of making endless power transmission belts.

The load-carrying section 17 of each belt element 11, 12 or 13 may be made of any suitable material and using any suitable technique known in the art. Preferably the load-carrying section is made of a helically-wound load carrying cord having individual turns thereof arranged in substantially equally spaced relation across each belt element.

While certain representative embodiments have been shown for the purpose of illustrating the invention, it will be apparent to those skilled in the art that changes and modifications can be made therein without departing from the scope of the inventions.

We claim:

1. An endless power transmission belt comprising a plurality of longitudinally extending, laterally spaced belt elements, each of said belt elements being of trapezoidal cross-section and having an inner compression section, a load-carrying section and an outer tension section, and a tie band interconnecting the radially outer surfaces of said belt elements, said tie band comprising a plurality of cooperating layers, one of said layers being bonded to said radially outer surfaces of said belt elements and comprising an elastomeric matrix having a plurality of discrete elongated fibers homogeneously dispersed therethrough and oriented at an angle of about 90° to the the endless path of said belt, and another of said layers comprising a fabric layer, wherein said spaced belt elements define grooves extending outwardly from the inner surface of said belt through said compression section, load-carrying section and tension section into said elastomeric matrix of said tie band, said grooves terminating short of and spaced from said fabric layer.

2. The belt of claim 1 wherein said fabric layer is a knitted fabric.

3. The belt of claim 1 wherein said fabric layer is a woven fabric having warps and wefts.

4. The belt of claim 3 wherein said warps and wefts are disposed at an angle of about 90° with each other.

5. The belt of claim 4 wherein said warps and wefts are disposed at an angle of 45° to the longitudinal axis of said belt.

6. The belt of claim 4 wherein said warps are disposed perpendicular to said longitudinal axis and said wefts are disposed parallel thereto.

7. The belt of claim 3 wherein said warps and wefts are disposed at an angle ranging between 95° and 155° with each other.

8. The belt of claim 1 wherein said fabric layer is a layer of tire cord having strength members and weak tie strands, said strength members being arranged in substantially parallel relation transverse the endless path of said belt.

9. The belt of claim 1 consisting of said belt elements, said elastomeric matrix layer adjacent said tension sections of said belt elements, a first fabric layer adjacent said matrix layer, a layer of elastomer adjacent said first fabric layer, and a second fabric layer adjacent said elastomeric layer.

10. A method for producing an endless power transmission belt having a plurality of longitudinally extending, laterally spaced belt elements and a tie band interconnecting the radially outer surfaces of said belt elements, each of said belt elements having an inner compression section, a load-carrying section and a tension section, said tie band comprising a plurality of cooperating layers; said method comprising the steps of building a belt sleeve by sequentially assembling a fabric layer, a layer of elastomeric matrix material having a plurality of discrete elongated fibers homogeneously dispersed therethrough with the majority of said fibers oriented approximately parallel to the longitudinal axis of said sleeve a layer of elastomeric material forming the tension section of said belt, a load-carrying layer and a layer of elastomeric material forming the compression section of said belt; curing the resulting belt sleeve to bond one of said layers to said radially outer surfaces of said belt elements, forming at least one groove in the outer surface of said sleeve extending along the endless path thereof and penetrating through said compression section, load-carrying section and tension section into said sleeve to intersect said layer of elastomeric matrix of said tie band, and grinding said sleeve to completely define said belt elements.

11. The method of claim 10 further comprising sequentially wrapping a layer of elastomeric material followed by a second fabric layer between said fabric layer and said layer of elastomeric matrix material.

* * * * *

UNITED STATES PATENT OFFICE
CERTIFICATE OF CORRECTION

Patent No. 4,177,688    Dated December 11, 1979

Inventor(s) Anderson W. Howerton, Darrell L. Klein and James R. Thomas

It is certified that error appears in the above-identified patent and that said Letters Patent are hereby corrected as shown below:

Column 3, line 43, "32" should appear after -- cord --

Column 3, line 54, "rotatble" should be -- rotatable -- .

Signed and Sealed this

Eighteenth Day of March 1980

[SEAL]

Attest:

Attesting Officer

SIDNEY A. DIAMOND

Commissioner of Patents and Trademarks